(12) United States Patent
Ponnuswamy

(10) Patent No.: US 10,555,255 B2
(45) Date of Patent: Feb. 4, 2020

(54) SELECTING AN ACCESS POINT FOR PROVIDING NETWORK ACCESS TO A WIRELESS DEVICE BASED ON HISTORICAL NETWORK ACTIVITY

(71) Applicant: KODACLOUD INC., Campbell, CA (US)

(72) Inventor: Subbu Ponnuswamy, Saratoga, CA (US)

(73) Assignee: KODACLOUD INC., Campbell, CA (US)

( * ) Notice: Subject to any disclaimer, the term of this patent is extended or adjusted under 35 U.S.C. 154(b) by 0 days.

(21) Appl. No.: 16/140,162

(22) Filed: Sep. 24, 2018

(65) Prior Publication Data

US 2019/0028965 A1  Jan. 24, 2019

Related U.S. Application Data

(63) Continuation of application No. 15/059,616, filed on Mar. 3, 2016, now Pat. No. 10,123,265.

(51) Int. Cl.
   *H04W 48/20* (2009.01)
   *H04L 29/08* (2006.01)

(52) U.S. Cl.
   CPC .......... *H04W 48/20* (2013.01); *H04L 67/141* (2013.01); *H04L 67/142* (2013.01); *H04L 67/146* (2013.01)

(58) Field of Classification Search
   CPC ...... H04W 48/20; H04L 29/08; H04L 67/141; H04L 67/142; H04L 67/146
   See application file for complete search history.

(56) References Cited

U.S. PATENT DOCUMENTS

| | | | |
|---|---|---|---|
| 9,544,293 B2* | 1/2017 | Mathew | H04L 67/141 |
| 2011/0237259 A1 | 9/2011 | Dimou et al. | |
| 2012/0046014 A1* | 2/2012 | Wachter | H04L 67/147 455/411 |
| 2014/0003342 A1 | 1/2014 | Sheriff et al. | |
| 2014/0274037 A1 | 9/2014 | Ganu et al. | |
| 2016/0028375 A1 | 1/2016 | Feldman et al. | |
| 2016/0112520 A1* | 4/2016 | Ganu | H04L 67/142 709/223 |
| 2016/0119838 A1 | 4/2016 | Kapoor et al. | |

* cited by examiner

*Primary Examiner* — Kyaw Z Soe
(74) *Attorney, Agent, or Firm* — Invoke

(57) ABSTRACT

Techniques are disclosed for selecting an access point for providing network access to a client device based on a historical network activity characteristic. An attribute associated with a current or future communication session corresponding to the client device is determined. A prior communication session, associated with the same attribute, is identified. A historical network activity characteristic, for the client device, corresponding to the prior communication session is selected. An access point is selected, from a group of access points, based on the historical network activity characteristic. The access point is selected for providing network access to the client device during the current or future communication session. Based on the selection, the client device associates with the selected access point.

20 Claims, 4 Drawing Sheets

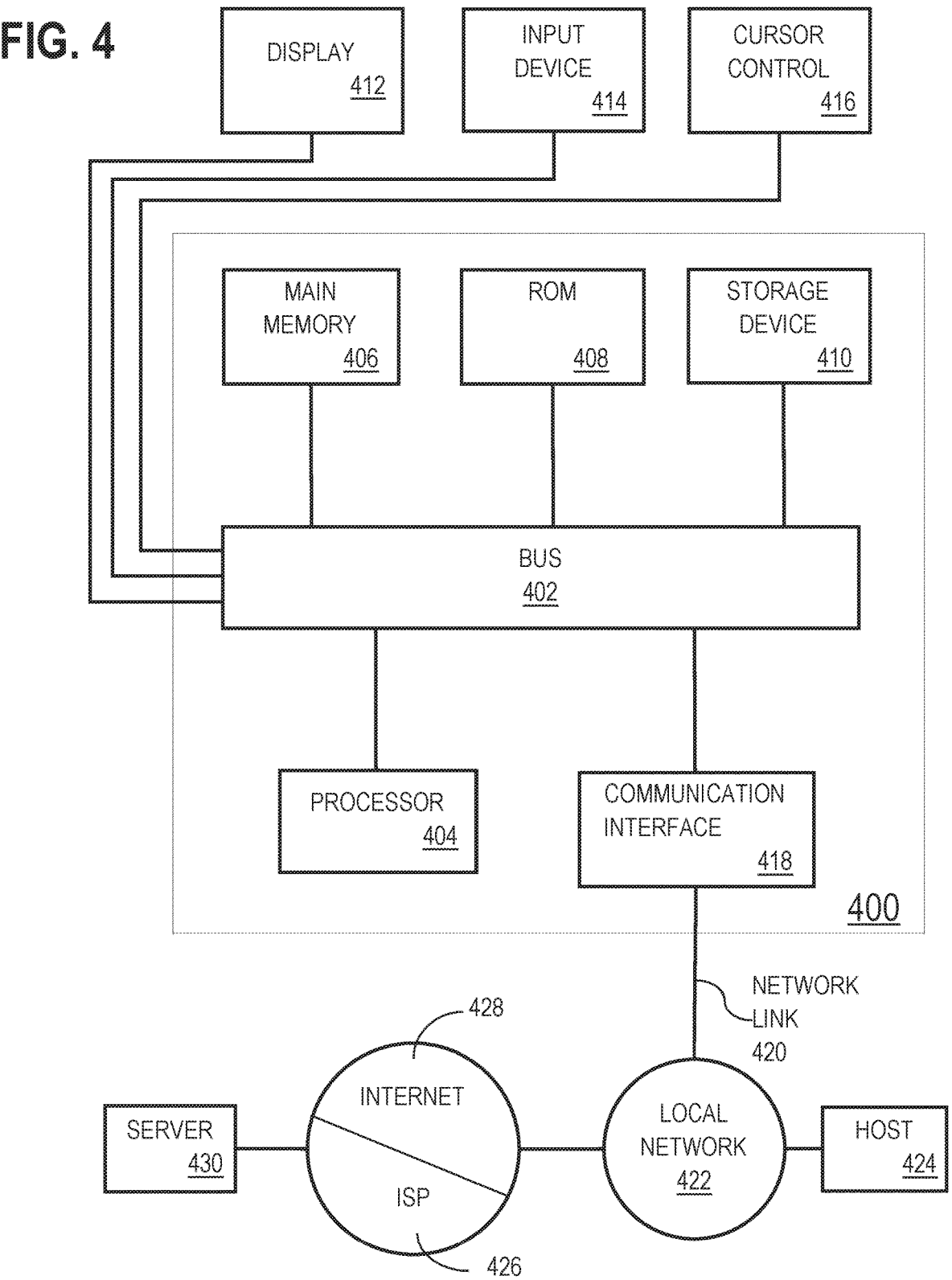

SELECTING AN ACCESS POINT FOR PROVIDING NETWORK ACCESS TO A WIRELESS DEVICE BASED ON HISTORICAL NETWORK ACTIVITY

INCORPORATION BY REFERENCE; DISCLAIMER

The following application is hereby incorporated by reference: Application Ser. No. 15/059,616 filed on Mar. 3, 2016; The Applicant hereby rescinds any disclaimer of claim scope in the parent application or the prosecution history thereof and advises the USPTO that the claims in this application may be broader than any claim in the parent application.

TECHNICAL FIELD

The present disclosure relates to selecting an access point for providing network access to a wireless device. In particular, the present disclosure relates to selecting an access point for providing network access to a wireless device based on historical network activity.

BACKGROUND

In recent years, Wireless Local Area Network (WLAN) technologies have emerged as a fast-growing market. Among the various WLAN technologies, the Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs wirelessly communicate with network devices. A client device may communicate with a network device to obtain access to a network resource. Alternatively, a client device may receive broadcast data from a network device, even if the client device had not requested access to a network resource. The client device may connect to the network resource only in response to a request or trigger. Network devices, such as access points, are digital devices that may be communicatively coupled to one or more networks (e.g., Internet, an intranet, etc.). Network devices may be directly connected to the one or more networks or connected via a controller. A network device, as referred to herein, may include a wireless Access Point (AP) that communicates wirelessly with devices using Wi-Fi, WiGig, Zigbee, Bluetooth or related standards and that communicates with a wired network. A network device may provide a wireless coverage area, within which devices may wirelessly connect to a network through the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include selecting an access point for providing network access to a client device based on historical network activity. An attribute associated with a particular communication session corresponding to a client device is determined. A prior communication session associated with the same attribute is identified. The prior communication session may correspond to the same client device or a different client device. A historical network activity characteristic corresponding to the identified prior communication session is selected. An access point is selected for providing network access to the client device, during the current or future communication session, based on the selected historical network activity characteristic. The client device associates with the selected access point during the current or future communication session.

Embodiments herein referring to a current communication session may be equally applicable to a future communication session. Embodiments herein referring to a future communication session may be equally applicable to a current communication session. As an example, operations for selecting an access point to provide network access to a client device during a current communication session may be equally applicable for selecting an access point to provide network access to the client device during a future communication session. Furthermore, operations for selecting an access point to provide network access to a client device during a future communication session may be equally applicable for selecting an access point to provide network access to the client device during a current communication session.

2. Architectural Overview

Figure 1:
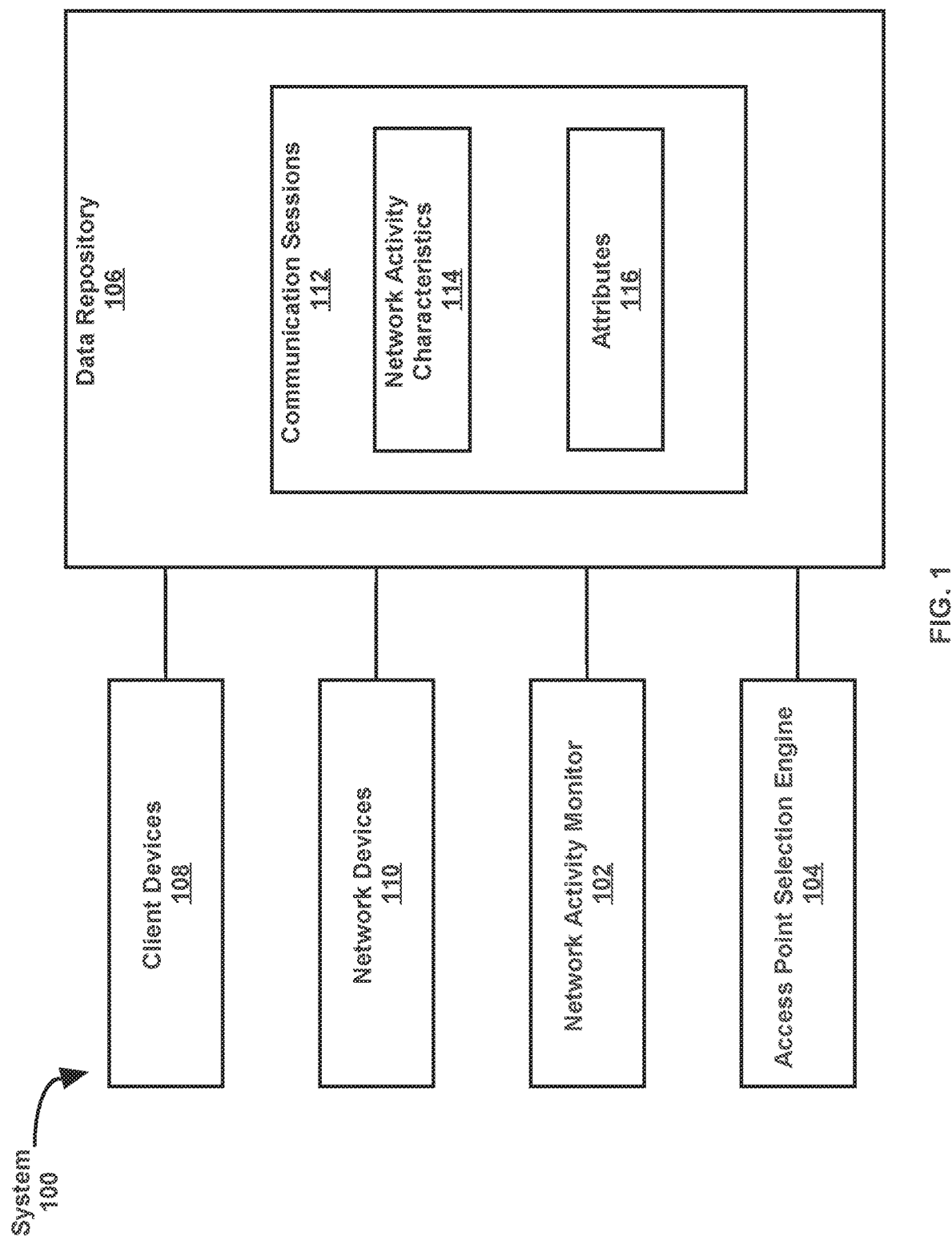
FIG. 1 illustrates a system in accordance with one or more embodiments.

FIG. 1 illustrates a system 100 in accordance with one or more embodiments. As illustrated in FIG. 1, system 100 includes client devices 108, network devices 110, a network activity monitor 102, an access point selection engine 104, and a data repository 106. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In an embodiment, system 100 may be implemented or executed as part of an Expert system, Rule-Based system, Self-Learning system, or Machine-Learning system, which implements Machine Intelligence or Artificial Intelligence techniques. System 100 may be executed and/or distributed on one or more network devices 110 that are local to a wireless environment provided by the network devices 110. Additionally or alternatively, system 100 may be executed and/or distributed on one or more digital devices that are remote from the wireless environment, such as a controller implemented in a cloud environment.

In one or more embodiments, a network device 110 is a digital device that facilitates communications between a client device 108 and a network resource. A network device 110 may receive information from a client device 108 and transmit the information to a network resource. Additionally or alternatively, a network device 110 may receive information from a network resource and transmit the information to a client device 108.

The term "digital device" generally refers to any hardware device that includes a processor. A digital device may refer to a physical controller device or a hardware device executing a virtual controller. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, and an Access Point (AP) (including a wireless AP).

A digital device may be a wireless device. A wireless device is configured to exchange information with another digital device, without being connected by an electrical conductor to the other digital device. A wireless device includes one or more radios that transmit and/or receive radio waves. Data may be encoded on a radio wave based on a communications protocol, such as the IEEE 802.11 standard. Additional examples of communications protocols include Wi-Fi, WiGig, Zigbee, and Bluetooth. An example of a wireless network device is a wireless AP. An AP may be wirelessly connected to a client device 108, while having a wired connection with a network resource.

In one or more embodiment, a client device 108 is configured to communicate wirelessly with a network device 110. A client device 108 may receive information from a network resource through a network device 110. Additionally or alternatively, a client device 108 may transmit information to a network resource through a network device 110.

As an example, a client device 108 may connect to a network resource through a network device 110. By connecting to the network resource, the client device 108 may receive web traffic, voice data streams, video data streams, and/or any other type of data.

As another example, a client device 108 may be located in a wireless environment without actively seeking to connect to a network resource. An Internet of Things (IoT) or Internet of Everything (IoE) environment may comprise a network of digital devices, each having particular functionality to sense, collect, monitor, detect, analyze, process, transmit, receive, and/or exchange data. An IoT or IoE device, operating in power-save mode, may not actively seek to connect to a network resource. The IoT or IoE device may periodically wake up to receive broadcast data from one or more network devices. The IoT or IoE device may use the broadcast data to determine whether data addressed to the IoT or IoE device was transmitted within the prior period. The IoT or IoE device may connect to a network resource only upon a particular trigger.

In one or more embodiments, data repository 106 is any type of storage unit and/or device (e.g., a file system, database, collection of tables, or any other storage mechanism) for storing data. Further, data repository 106 may include multiple different storage units and/or devices. The multiple different storage units and/or devices may or may not be of the same type or located at the same physical site. Further, data repository 106 may be implemented or may execute on the same computing system as network activity monitor 102 and/or access point selection engine 104. Alternatively or additionally, data repository 106 may be implemented or executed on a separate computing system than network activity monitor 102 and/or access point selection engine 104. Data repository 106 may be connected to network activity monitor 102 and/or access point selection engine 104 via a direct connection or via a network.

Data sets describing communication sessions 112, network activity characteristics 114, and attributes 116 may be implemented across any of components within system 100. However, the data sets are illustrated within data repository 106 for purposes of clarity and explanation.

In one or more embodiments, a communication session 112 comprises communications between a client device 108 and one or more APs during a particular time period. A client device may roam from one AP to another AP during the same communication session. For example, a client device may roam to different APs until the client device associates with an AP that can satisfy the requirements of the client device. Metadata associated with a communication session may identify (a) an AP that provided unsatisfactory network access to the client device during the communication session and/or (b) an AP that provided satisfactory network access to the client device during the communication session. A communication session 112 may be associated with a network activity characteristic 114 and an attribute 116.

Network activity characteristics 114 include characteristics relating to transmission and/or receipt of network data, beacons, management frames, control frames, broadcast data, power-save indications, and any other information between a client device 108 and an AP. A network activity may be, for example, voice data transmitted from a client device 108 to an AP. As another example, a network activity may be an error code received by a client device 108 from an AP.

An example of a network activity characteristic 114 is a load of the network activity between a client device 108 and an AP during a communication session 112. The load may be expressed as the amount of data being transferred between the client device 108 and the AP, divided by a duration of time used to transfer the data.

Another example of a network activity characteristic 114 is a latency sensitivity associated with the data being transmitted during a communication session 112. Video data is more sensitive to latency than other types of data such as textual data. A disruption in a wireless connection may cause a video stream to become jittery and/or interrupted. In contrast, a disruption in a wireless connection may not be noticeable to a user when receiving textual data.

Another example of a network activity characteristic 114 is wired network activity. Wired network activity includes, for example, (a) activity between an AP and a switch, (b) activity between an AP and an application gateway, and (c) activity between an AP and/or a security appliance. APs connected to different switches and/or gateways may have different wired network behavior. Wired network activity may affect the exchange of wireless signals between an AP and a client device 108. As an example, a particular wired network activity may cause a latency in the exchange of wireless signals between an AP and a client device 108. As another example, a particular wired network activity may cause jitter or a low mean opinion score (MOS) score for an exchange of voice or video data.

Attributes 116 of a communication session 112 include any attributes associated with a client device 108, a network device 110, and/or the communication session 112. An attribute 116 may be, for example, a time of day, a day of week, or any other time period during which the communication session 112 occurs. Another example of an attribute 116 is a duration of the communication session 112.

Additionally or alternatively, an attribute 116 may be a location of a client device 108 during the communication session 112. Another example of an attribute 116 is a user that is using a client device 108 during the communication session. Another example of an attribute 116 is a network condition during the communication session 112, such as a wireless configuration associated with a client device 108 and/or a network device 110, or a particular application executing on a client device 108. Another example of an attribute 116 is a device model and/or manufacturer of a client device 108. Another example of an attribute 116 is a device behavior of the client device 108. Device behavior includes a traffic pattern and/or a roaming pattern of the client device 108. For example, the client device 108 may be configured to roam when a received signal strength is below a particular threshold value.

In one or more embodiments, network activity monitor 102 refers to hardware and/or software configured to perform operations for monitoring network activity characteristics 114. Network activity characteristics 114 of multiple communication sessions 112 are determined and stored. A network activity characteristic 114 of a prior communication session 112 is referred to herein as a "historical network activity characteristic."

In one or more embodiments, access point selection engine 104 refers to hardware and/or software configured to perform operations described herein for selecting an access point for providing network access to a client device based on a historical network activity characteristic. Examples of operations for selecting an access point based on a historical network activity characteristic are described below with reference to FIG. 2.

Network activity monitor 102 and/or access point selection engine 104 are implemented on one or more network devices 110, such as an AP. Additionally or alternatively, network activity monitor 102 and/or access point selection engine 104 are implemented on one or more other digital devices, such as a cloud controller.

3. Selecting an Access Point Based on Historical Network Activity

Figure 2:
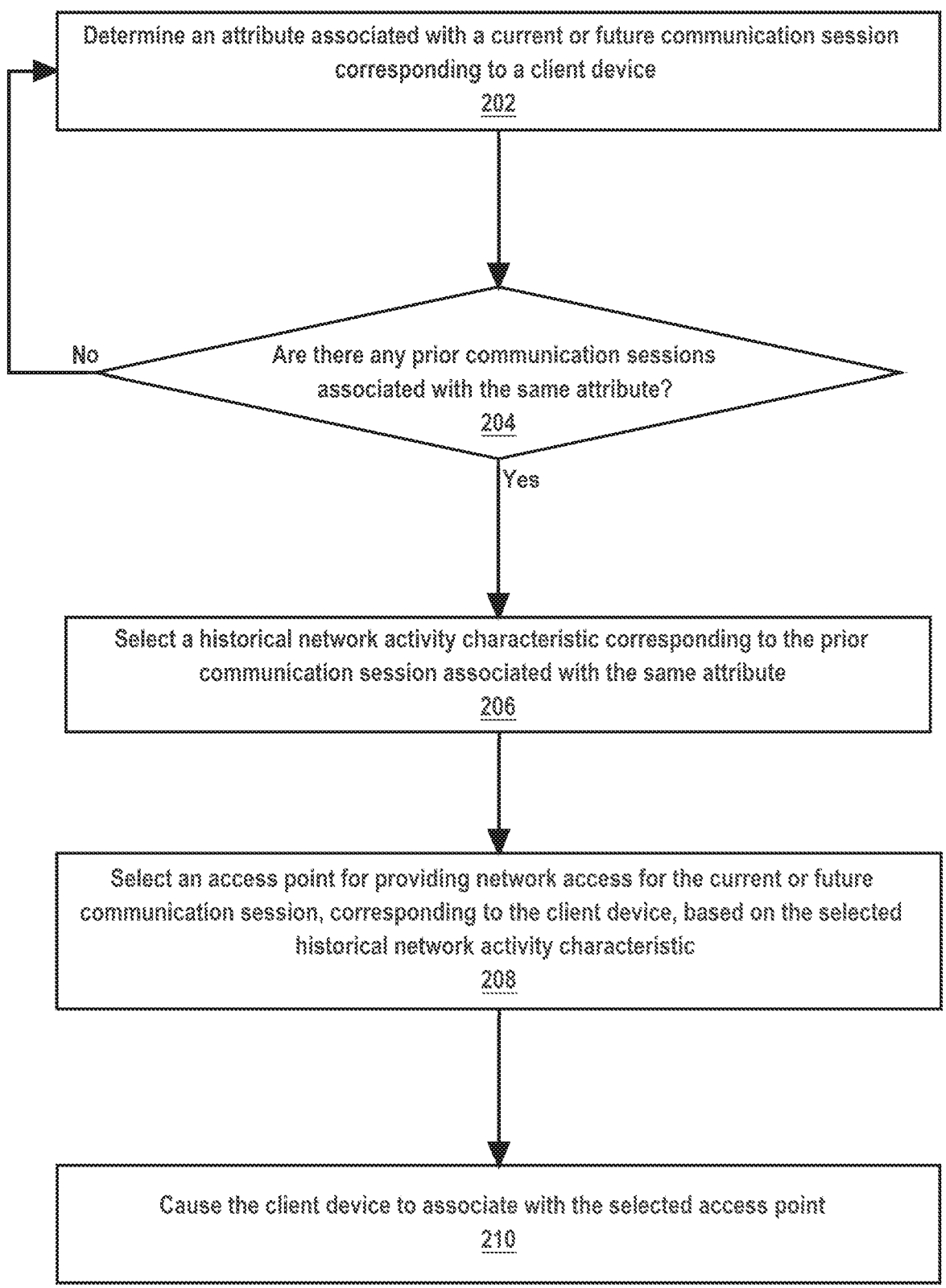
FIG. 2 illustrates an example set of operations for selecting an access point for providing network access to a client device based on a historical network activity characteristic, in accordance with one or more embodiments.

FIG. 2 illustrates an example set of operations for determining a performance criterion based on a rate of mobility of a client device, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include determining an attribute associated with a current (or future) communication session corresponding to a client device (Operation 202). Different attributes may be determined in different ways.

A. A Time Period as an Attribute Associated with a Current or Future Communication Session An attribute associated with a current (or future) communication session, corresponding to the client device, may be a time of day, a day of week, or any other time period.

A time period of a current communication session may be determined based on a clock of the client device itself, another client device, and/or a network device. As communications between the client device and an AP are being transmitted for the current communication session, a time is read from the clock of a device. The time is determined as an attribute of the current communication session.

A time period of a future communication session may be determined based on a pattern associated with a set of prior communication sessions. A set of prior communication sessions occur according to a cyclical pattern (such as, daily, weekly, or monthly). A future communication session is expected to follow the cyclical pattern. For example, if a client device has a historical pattern of transmitting a sensor data or a log at 1 a.m. daily, then a communication session would be expected at 1 a.m. today, and on any day in the future. An attribute of the cyclical pattern (such as, 1 a.m.) is determined as an attribute associated with the future communication session.

Similarly, a duration of a current (or future) communication session may be determined. A start time of a current communication session may be determined based on a clock of the client device itself, another client device, and/or a network device, as described above. Alternatively, a duration of a future communication session may be determined based on a pattern associated with a set of prior communication sessions. A future communication session is expected to follow a cyclical pattern of prior communication sessions. If prior communication sessions have a particular average duration, then the future communication is expected to have the same particular duration.

B. A Location as an Attribute Associated with a Current or Future Communication Session Additionally or alternatively, an attribute associated with a current (or future) communication session, corresponding to the client device, may be a physical location or radio frequency (RF) location of the client device.

A physical location may be self-reported by the client device itself (for example, using a Global Positioning System (GPS) corresponding to the client device). Alternatively, a physical location of the client device may be computed or estimated based on a signal strength of a wireless signal received by the client device and/or another wireless device. As an example, a first device may transmit a wireless signal. A second device may detect a received signal strength of the wireless signal. Based on the signal strength, and a known path loss model for the wireless environment, a distance between the first device and the second device may be determined. As another example, a particular device may detect multiple signal strengths of wireless signals received from multiple devices. Based on the signal strengths, a distance from the particular device to each of the other devices may be determined. Using triangulation and/or trilateration of the distances between the particular device and the other devices, a physical location of the particular device may be determined.

A RF location of a client device is the location of the client device with respect to other devices, such as APs. As an example, the RF location of a client device may be determined using APs with omni-directional antennas. The RF location may be approximated as an overlapping region corresponding to (a) three meters from a first access point and (b) five meters from a second access point. In another example, the RF location of a client device may be determined using an AP with a directional antenna. The RF location may be approximated as four meters in a Northeast direction from the AP.

A RF location of a client device may be identified in various ways. A RF location of a client device may be determined based on a received signal strength of a wireless signal detected by the client device. Alternatively, a RF location of a client device may be determined based on the received signal strength of a wireless signal that was transmitted by the client device and detected by another device.

C. A Network Condition as an Attribute Associated with a Current or Future Communication Session Additionally or alternatively, an attribute associated with a current (or future) communication session, corresponding to the client device, may be one or more network conditions. A network condition may be determined by the client device itself, another client device, and/or a network device.

A network condition may be a wireless configuration associated with the client device and/or the AP associated with the current communication session. The wireless configuration may be self-reported by the client device and/or the AP. Examples of wireless configurations of a network device include but are not limited to a transmit power, a Modulation and Coding Scheme (MCS) or a Physical Layer (PHY) rate, a probe response threshold, a disassociate threshold, a receive sensitivity, a receive gain, a transmit cell size, a receive cell size, and a radio frequency (RF) channel. Examples of wireless configurations of a client device include but are not limited to a transmit power, a transmit cell size, a receive cell size, a MCS or PHY rate, a retry rate, and an aggregation size.

A network condition may be a particular application executing on the client device associated with the current communication session. A particular application executing on the client device may be self-reported by the client device itself, or may be determined or inferred based on a wireless signal transmitted by the client device.

As an example, a client device may execute a particular application during a communication session. Requests from the particular application may be addressed to a particular network resource. The client device transmits wireless signals enclosing the requests that are addressed to the particular network resource. Based on the particular network resource indicated in the wireless signals, the particular application executing on the client device may be identified. The particular application may be determined as an attribute associated with the communication session.

D. A User (or Device Model, Device Behavior) as an Attribute Associated with a Current or Future Communication Session Additionally or alternatively, an attribute associated with a current (or future) communication session, corresponding to the client device, may be a user that is using the client device. As an example, a user may login into a client device, or a particular application executing on the client device. During a communication session, the client device may transmit a wireless signal indicating the identity of the user. The user may be determined as an attribute associated with the communication session.

Additionally or alternatively, an attribute associated with a current (or future) communication session, corresponding to the client device, may be a device model and/or device behavior of the client device. The device model and/or device behavior may be self-reported by the client device itself. The device model and/or device behavior may be determined based on wireless signals transmitted from the client device. As an example, a client device may roam from one AP to another AP when the received signal strength falls below a particular threshold value. The particular threshold value may determine a roaming pattern of the client device, which may be an attribute associated with the communication session.

Continuing with FIG. 2, one or more embodiments include determining whether there are any prior communication session, corresponding to the same client device, associated with the same attribute as the current (or future) communication session (Operation 204). Prior communication sessions and corresponding attributes are retrieved from a data repository. The data repository stores prior communication sessions and corresponding attributes in any format, such as a neural network memory, table, linked list, array, database, or log.

The attribute associated with the current (or future) communication session, which was determined at Operation 202, is compared to an attribute associated with a prior communication session. A match is determined if the two attributes are the same. As an example, a user using a client device during a prior communication session may be John Smith. A user using the client device during a current communication session may also be John Smith. Since the users are the same, a match is found. The prior communication session is associated with the same attribute (the same user) as the current communication session.

Alternatively, a match is determined if the attribute associated with the current communication session and the attribute associated with the prior communication session are within a specified range. As an example, two locations may be found to match if the two locations are within 0.5 meters apart. A client device may be located at the (x,y) coordinates (12, 13) during a prior communication session. The client device may be located at the (x,y) coordinates (12, 14) during a current communication session. Based on the (x,y) coordinates, the current client location and the prior client location are determined to be 0.4 meters apart. Since a distance between the current client location and the prior client location are within the specified range (0.5 meters), a match is found. The prior communication session is associated with the same attribute as the current communication session.

Attributes of current and/or future communication sessions are periodically and/or repeatedly monitored to determine if any prior communication session is associated with a same attribute as a current and/or future communication session.

If a prior communication session is associated with the same attribute as a current communication session, then a historical network activity characteristic, for the client device, corresponding to the prior communication session is selected (Operation 206). The historical network activity characteristic is retrieved from a data repository. The data repository stores prior communication sessions and corresponding network activity characteristics in any format, such as a neural network memory, table, linked list, array, database, or log. The data repository may store prior communication sessions, corresponding network activity characteristics, and corresponding attributes in the same neural network memory, table, linked list, array, database, or log.

If more than one prior communication sessions are associated with the same attribute as the current communication session, then multiple historical network activity characteristics, for the client device, corresponding to the prior communication sessions may be selected.

One or more embodiments include selecting an access point for providing network access for the current (or future) communication session, corresponding to the client device, based on the selected historical network activity characteristic (Operation 208). An access point may be selected for the current communication session based on (1) a mapping between historical network activity characteristics and APs to be selected, (2) an estimated network activity characteristic corresponding to the current communication session, which is estimated based on the selected historical network activity, and/or (3) loads of other communication sessions occurring at the same time as the current communication session.

A. Selecting an Access Point for a Current Communication Session Based on a Mapping Between Historical Network Activity Characteristics and Access Points to be Selected In an embodiment, a set of rules may map (a) a historical network activity characteristic associated with a prior communication session to (b) an AP that is to be selected for a current communication session. The set of rules is retrieved from a data repository or neural network memory, and applied to the selected historical network activity characteristic. The set of rules may be fixed, or may be dynamically updated based on machine learning and/or artificial intelligence. Based on the set of rules, an AP is selected for providing network access for the current communication session corresponding to the client device.

B. Selecting an Access Point for a Current Communication Session Based on an Estimated Network Activity Characteristic of the Current Communication Session In an embodiment, a network activity characteristic corresponding to a current communication session may be estimated based on a historical network activity characteristic. The historical network activity characteristic corresponds to a prior communication session that is associated with a same attribute as the current communication session.

A set of rules may map (a) a network activity characteristic associated with the current communication session to (b) an AP that is to be selected for the current communication session. The set of rules is retrieved from a data repository or neural network memory, and applied to the estimated network activity characteristic for the current communication session. The set of rules may be fixed, or may be dynamically updated based on machine learning and/or artificial intelligence. Based on the set of rules, an AP is selected for providing network access for the current communication session corresponding to the client device.

As an example, during a prior communication session, a client device may stream video data. The video stream may be determined to have a particular level of latency sensitivity. During a current communication session, which is associated with a same attribute as the prior communication session, a latency sensitivity of the client device may be estimated. The client device may be estimated to have the same particular level of latency sensitivity during the current communication session as the prior communication session.

Continuing the example, a set of rules may specify that a particular AP is dedicated for network activity of the particular level of latency sensitivity. Since the client device is estimated to be associated with the particular level of latency sensitivity during the current communication session, the dedicated AP is selected for the current communication session corresponding to the client device.

As another example, during a prior communication session, a client device may be associated with a particular load. During a current communication session, which is associated with a same attribute as the prior communication session, a load of the client device may be estimated. The client device may be estimated to have the same particular load during the current communication session as the prior communication session.

Continuing the example, a set of rules may map client device loads to particular network conditions. The set of rules may determine that, based on the particular load estimated for the client device, the client device should be operate on a particular RF channel, with a particular MCS rate. The RF channel and MCS rate of neighboring APs may be determined. An AP that is operating on the particular RF channel, with the particular MCS rate, may be selected for the current communication session corresponding to the client device.

A network activity characteristic of a current communication session may be estimated based on multiple historical network activity characteristics corresponding to multiple prior communication sessions. An average and/or pattern associated with the multiple historical network activity characteristics may be determined. The average and/or pattern may be used to select an access point for the current communication session corresponding to the client device.

As an example, an attribute of a prior communication session may be a time of 10 p.m. on Jan. 14, 2016. An attribute of another prior communication session may be a time of 10 p.m. on Jan. 13, 2016. Both prior communication sessions are associated with a same time of day as a current communication session expected to be at 10 p.m. on Jan. 15, 2016.

Continuing the example, a load of the January 14 communication session may be 10 Mbps. A load of the January 13 communication session may be 12 Mbps. The average load of the prior communication sessions may be 11 Mbps. The average load of 11 Mbps may be determined as an estimated load of the current communication session.

Continuing the example, a set of rules, retrieved from a data repository, may be applied to the estimated load of the current communication session of 11 Mbps. The set of rules may map (a) the estimated load of the current communication session to (b) a particular AP that is to be selected for the current communication session. Based on the set of rules, the particular AP is selected for the current communication session.

As another example, a client device may transmit an activity log to a server on a daily basis. The activity on the log may grow over time. The log transmitted at 10 p.m. on Jan. 14, 2016, was 1,000 MB. The log transmitted at 10 p.m. on Jan. 13, 2016, was 990 MB. The log transmitted at 10 p.m. on Jan. 12, 2016, was 980 MB. A pattern associated with the log transfer indicates that the amount of data transferred increases at 10 MB per day. Based on the pattern, a data transfer associated with a communication session at 10 p.m. on Jan. 15, 2016, may be estimated to be 1,010 MB (which is 10 MB more than the data transfer on the prior day).

Continuing the example, a set of rules may be retrieved from a data repository or neutral network memory. The set of rules may be applied to the estimated size of the data transfer associated with the current communication session, which is 1,010 MB. The set of rules may map (a) the estimated size of the data transfer associated with the current communication session to (b) a particular AP that is to be selected for the current communication session. Based on the set of rules, the particular AP is selected for the current communication session.

C. Selecting an Access Point for a Current Communication Session Based on Loads of Other Communication Sessions Occurring at the Same Time as the Current Communication Session In an embodiment, loads of a set of one or more communication sessions may be determined to select an AP for providing network access for a particular current (or future) communication session.

Loads of the set of communication sessions are determined by detecting an amount of data transferred over a time period. The set of communication sessions include current communication sessions that (a) are associated with a same particular AP and (b) occur at the same time as, or within a specified time range from, the particular communication session (for which an AP is to be selected).

An estimated load of the particular communication session is determined based on a historical load of a prior communication session. As an example, the estimated load of the particular communication session may be the same as the historical load of a prior communication session associated with the same attribute as the particular communication session. As another example, the estimated load of the particular communication session may be determined based on an average and/or pattern associated with historical loads of multiple prior communication sessions, each associated with the same attribute as the particular communication session.

A sum of (a) the loads of the set of communication sessions and (b) the estimated load of the particular communication session is determined. The sum constitutes an estimated total load of the particular AP (which is associated with the set of communication sessions), as if the particular AP were providing network access for the particular communication session. The sum is compared to a maximum total load that the particular AP is able to accept. If the maximum total load would not be exceeded, then the particular AP is selected for providing network access for the particular communication session. If the maximum total load would be exceeded, then the particular AP is not selected for providing network access for the particular communication session.

As an example, a future communication session corresponding to Client Device X is expected to occur at 10 p.m. An estimated load of the future communication session is 10 Mbps. Loads of current communication sessions that are within one (1) minute of the future communication session may be used to select an AP for the future communication session.

Continuing the example, at 9:59 pm, a communication session between Client Device Y and a particular AP is associated with a load of 100 Mbps. Since the communication session is within the specified range (one minute) from the future communication session, the load of the communication session (100 Mbps) is used to select an AP for the future communication session.

Continuing the example, a maximum total load that the particular AP is able to accept may be 105 Mbps. If the particular AP were to provide network access for the future communication session, then the estimated total load of the particular AP would be the sum of (a) the load of the communication session between Client Device Y and the particular AP (100 Mbps) and (b) an estimated load of the future communication session (which is estimated, based on a historical network activity characteristic, to be 10 Mbps). Since the estimated total load of the particular AP (110 Mbps) is above the maximum total load of the particular AP (105 Mbps), the particular AP is not selected for providing network access for the future communication session corresponding to Client Device X.

Continuing with FIG. 2, one or more embodiments include causing the client device to associate with the selected AP (Operation 210). A client device associates with an AP through an 802.11 authentication process. First, the client device transmits a probe request to discover APs within the client device's proximity. The probe request advertises the client device's supported data rates and capabilities. An AP that receives the probe request and is associated with a compatible data rate transmits a probe response to the client device. The client device then transmits an authentication request to the AP. The authentication request may include a shared key, such as a Wired Equivalent Privacy (WEP) key, a Wi-Fi Protected Access (WPA) key, or a Wi-Fi Protected Access 2 (WPA2) key. The AP transmits an authentication response to the client device. At this point, the client device is authenticated but not yet associated. The client device then transmits an association request to the AP. If the association is not successful, the AP transmits a status code indicating unsuccessful association. If association is successful, the AP transmits an association response to the client device. The association response includes a status code indicating successful association. The client device is then authenticated and associated with the AP.

APs other than the selected AP are configured to reject association with the client device. An AP may reject being associated with the client device at any stage during the 802.11 authentication process. The AP may refrain from transmitting a probe response, an authentication response, and/or an association response. Since the client device cannot associate with APs other than the selected AP, the client device associates with the selected AP.

Additionally or alternatively, a command is transmitted to the client device. The command directs the client device to associate with the selected AP. Based on the command, the client device associates with the selected AP.

4. Example Embodiment

Figure 3:
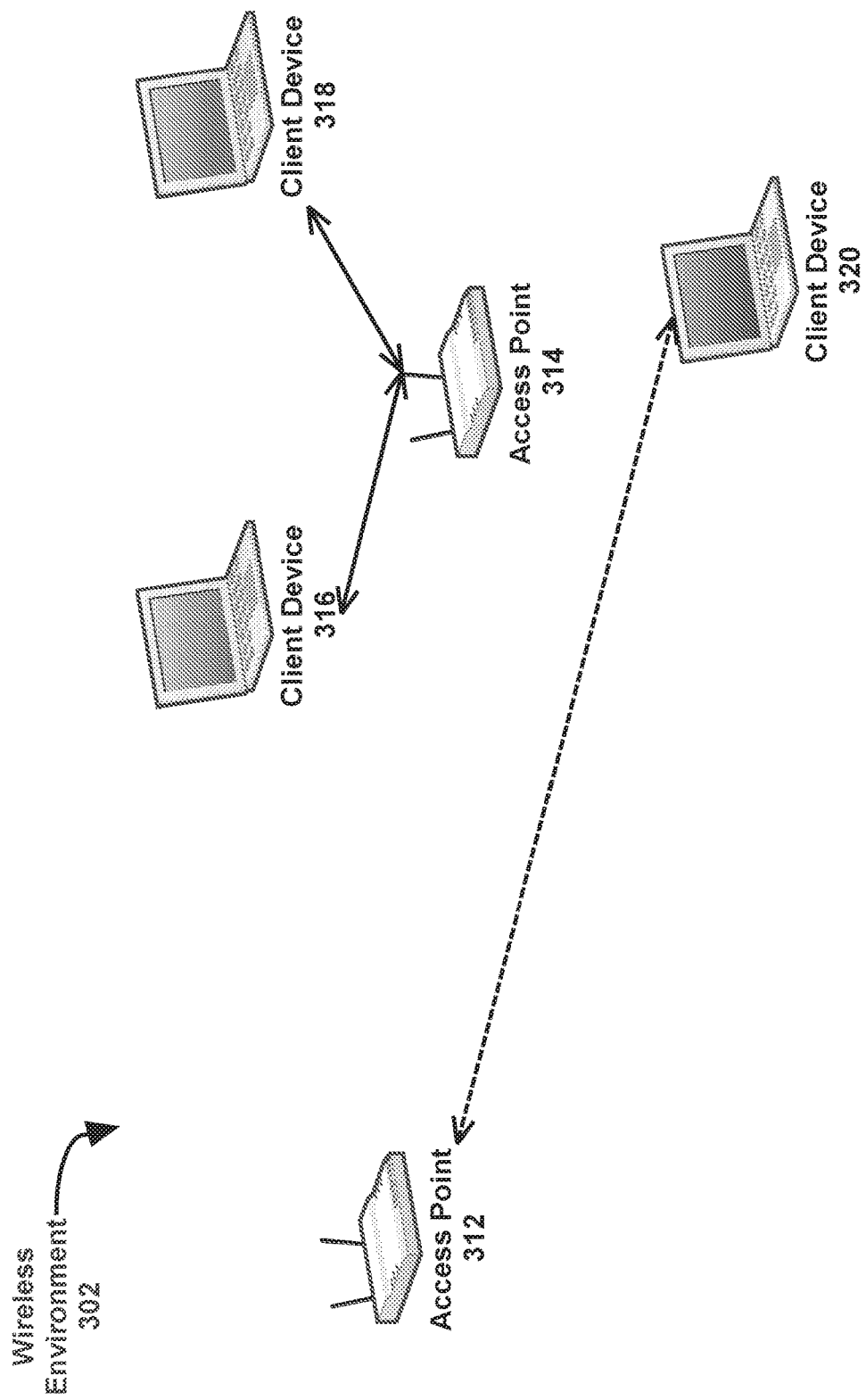
FIG. 3 illustrates an example of selecting an access point for providing network access to a client device based on a historical network activity characteristic, in accordance with one or more embodiments.

A detailed example is described below for purposes of clarity. Components and/or operations described below should be understood as one specific example which may not be applicable to certain embodiments. Accordingly, components and/or operations described below should not be construed as limiting the scope of any of the claims. FIG. 3 illustrates an example of selecting an access point for providing network access to a client device based on a historical network activity characteristic, in accordance with one or more embodiments.

As illustrated, wireless environment 302 includes access points 312-314 and client devices 316-320. Client device 320 is physically closer to access point 314 than to access point 312. Client device 320 detects wireless signals from access point 314 at stronger signal strengths than wireless signals from access point 312. Based on the signal strengths, client device 320 is initially associated with access point 314.

A future communication session corresponding to client device 320 is expected to occur later today, at 10 p.m. The future communication session is expected to occur based on a pattern of prior communication sessions, corresponding to client device 320, which occurred at 10 p.m. on a daily basis.

The prior communication sessions are identified as communication sessions being associated with a same attribute (same time of day) as the future communication session. Historical network activity characteristics corresponding to the prior communication sessions are selected. One prior communication session is associated with a load of 50 Mbps. Another prior communication session is associated with a load of 48 Mbps.

An estimated load of the future communication session is determined based on an average load of the prior communication sessions. The average load of the prior communication sessions is 49 Mbps. Hence the estimated load of the future communication session is 49 Mbps.

Loads of current communication sessions that are within one minute from the future communication session are used to select an AP for the future communication session. At 9:59 p.m. (which is one minute from the time of the future communication session), client device 316 and access point 314 are in a current communication session, and client device 318 and access point 314 are in another current communication session.

An amount of data transferred between client device 316 and access point 314 is detected over a time period. The amount of data transferred is divided by the duration of the time period to determine a load of the communication session between client device 316 and access point 314. The load is determined to be 25 Mbps.

An amount of data transferred between client device 318 and access point 314 is detected over a time period. The amount of data transferred is divided by the duration of the time period to determine a load of the communication session between client device 318 and access point 314. The load is determined to be 30 Mbps.

If access point 314 provides network access for the future communication session corresponding to client device 320, then an estimated total load of access point 314 would be a sum of (a) the loads of the communication sessions corresponding respectively to client device 316 and client device 318 and (b) the estimated load of the future communication session corresponding to client device 320. The estimated total load of access point 314 is determined to be 25+30+49=104 Mbps.

A maximum total load that access point 314 is able to accept is 100 Mbps. Since the estimated total load of access point 314 exceeds the maximum total load, access point 314 is not selected for providing network access for the future communication session.

Meanwhile, at 9:59 p.m., no communication sessions are associated with access point 312. An estimated total load of access point 312, if access point 312 provides network access for the future communication session, would be 49 Mbps.

A maximum total load that access point 312 is able to accept is 100 Mbps. Since the estimated total load of access point 312 does not exceed the maximum total load, access point 312 is selected for providing network access for the future communication session.

Before or at the time that the future communication session is expected to occur, access point 314 rejects association with client device 320. Client device 320 transmits a probe request to associate with another access point. Access point 312 transmits a probe response. An 802.11 authentication process is completed between client device 320 and access point 312. Client device 320 associates with access point 312 rather than access point 314. After client device 320 is associated with access point 312, the future communication session begins. Hence, access point 312 provides network access for the future communication session corresponding to client device 320.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   determining an attribute associated with a first communication session corresponding to a first client device;
   determining that a prior communication session, of a plurality of prior communication sessions, is associated with the attribute;

determining a historical network activity characteristic associated with the prior communication session;
determining an estimated network activity characteristic associated with the first communication session based on the historical network activity characteristic associated with the prior communication session;
selecting a first access point, from a plurality of access points, for conducting the first communication session corresponding to the first client device based on the estimated network activity characteristic associated with the first communication session; and
causing the first client device to associate with the first access point.

2. The medium of claim 1, wherein the historical network activity characteristic and the estimated network activity characteristic are different.

3. The medium of claim 1, wherein the historical network activity characteristic and the estimated network activity characteristic are same.

4. The medium of claim 1, wherein the operations further comprise:
determining a pattern associated with a set of prior communication sessions, of the plurality of prior communication sessions, that are associated with the attribute, wherein the set of prior communication sessions comprises the prior communication session;
determining the estimated network activity characteristic associated with the first communication session further based on the pattern associated with the set of prior communication sessions.

5. The medium of claim 1, wherein the historical network activity characteristic comprises a load associated with the prior communication session.

6. The medium of claim 1, wherein the historical network activity characteristic comprises a latency sensitivity associated with the prior communication session.

7. The medium of claim 1, wherein the historical network activity characteristic comprises a latency associated with the prior communication session.

8. The medium of claim 1, wherein the historical network activity characteristic comprises a data quality associated with the prior communication session.

9. The medium of claim 1, wherein the attribute comprises a network condition associated with the first communication session.

10. The medium of claim 1, wherein the attribute comprises a user associated with the first communication session.

11. The medium of claim 1, wherein:
the historical network activity characteristic associated with the prior communication session comprises at least one of:
(a) a load associated with the prior communication session;
(b) a latency sensitivity associated with the prior communication session;
(c) a latency associated with the prior communication session;
(d) a data quality associated with the prior communication session; and
the attribute associated with the prior communication session comprises at least one of:
(a) a time of day associated with the prior communication session;
(b) a network condition associated with the prior communication session;
(c) a user associated with the prior communication session;
(d) a location of a second client device associated with the prior communication session;
(e) an application executing on the second client device associated with the prior communication session;
(f) a device model of the second client device associated with the prior communication session;
(g) a device behavior of the second client device associated with the prior communication session;
(h) a duration of the prior communication session.

12. The medium of claim 1, wherein the operations further comprise:
determining a load associated with a second access point of the plurality of access points;
selecting the first access point, from the plurality of access points, for conducting the first communication session corresponding to the first client device further based on the load of the second access point.

13. The medium of claim 1, wherein the operations further comprise:
determining a load associated with the first access point of the plurality of access points;
selecting the first access point, from the plurality of access points, for conducting the first communication session corresponding to the first client device further based on the load of the first access point.

14. The medium of claim 1, wherein the first client device detects a first wireless signal from the first access point and a second wireless signal from a second access point of the plurality of access points, and a first signal strength of the first wireless signal is less than a second signal strength of the second wireless signal.

15. The medium of claim 1, wherein the prior communication session is conducted using a second access point different than the first access point.

16. The medium of claim 1, wherein the prior communication session is conducted using a second client device different than the first client device.

17. The medium of claim 1, wherein the first communication session comprises a current communication session.

18. The medium of claim 1, wherein the first communication session comprises a future communication session.

19. A system, comprising:
at least one device including a hardware processor; and
the system being configured to perform operations comprising:
determining an attribute associated with a first communication session corresponding to a first client device;
determining that a prior communication session, of a plurality of prior communication sessions, is associated with the attribute;
determining a historical network activity characteristic associated with the prior communication session;
determining an estimated network activity characteristic associated with the first communication session based on the historical network activity characteristic associated with the prior communication session;
selecting a first access point, from a plurality of access points, for conducting the first communication session corresponding to the first client device based on the estimated network activity characteristic associated with the first communication session; and
causing the first client device to associate with the first access point.

20. A method, comprising:
  determining an attribute associated with a first communication session corresponding to a first client device;
  determining that a prior communication session, of a plurality of prior communication sessions, is associated with the attribute;
  determining a historical network activity characteristic associated with the prior communication session;
  determining an estimated network activity characteristic associated with the first communication session based on the historical network activity characteristic associated with the prior communication session;
  selecting a first access point, from a plurality of access points, for conducting the first communication session corresponding to the first client device based on the estimated network activity characteristic associated with the first communication session; and
  causing the first client device to associate with the first access point;
  wherein the method is performed by at least one device including a hardware processor.

* * * * *